United States Patent
Dasan et al.

(10) Patent No.: US 7,620,731 B1
(45) Date of Patent: Nov. 17, 2009

(54) ISOLATED PERSISTENT STORAGE

(75) Inventors: Shajan Dasan, Bellevue, WA (US); Loren M. Kohnfelder, Bellevue, WA (US); Michael J. Toutonghi, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1031 days.

(21) Appl. No.: 09/790,840

(22) Filed: Feb. 21, 2001

(51) Int. Cl.
*G06F 15/173* (2006.01)

(52) U.S. Cl. .............. 709/239; 709/226; 709/229; 709/203; 709/206; 709/217; 709/238

(58) Field of Classification Search .............. 709/229, 709/226, 203, 206, 217, 238, 239
See application file for complete search history.

(56) References Cited

U.S. PATENT DOCUMENTS

| | | | | |
|---|---|---|---|---|
| 5,191,611 A * | 3/1993 | Lang | ............................ | 705/53 |
| 5,703,951 A * | 12/1997 | Dolphin | ........................ | 705/51 |
| 5,748,890 A * | 5/1998 | Goldberg et al. | ................ | 726/2 |
| 5,822,569 A * | 10/1998 | McPartlan et al. | ............ | 703/21 |
| 5,873,076 A * | 2/1999 | Barr et al. | ........................ | 707/3 |
| 5,893,118 A * | 4/1999 | Sonderegger | ................ | 707/203 |
| 6,052,528 A * | 4/2000 | Dechamboux | .............. | 717/116 |
| 6,061,693 A * | 5/2000 | Carney et al. | ................ | 707/200 |
| 6,085,030 A * | 7/2000 | Whitehead et al. | ........... | 709/203 |
| 6,237,144 B1 * | 5/2001 | Delo | ............................ | 717/174 |
| 6,257,774 B1 * | 7/2001 | Stack | ............................ | 717/110 |
| 6,263,377 B1 * | 7/2001 | Monday et al. | ............... | 719/320 |
| 6,286,052 B1 * | 9/2001 | McCloghrie et al. | ......... | 709/238 |
| 6,301,601 B1 * | 10/2001 | Helland et al. | ............... | 718/101 |
| 6,324,691 B1 * | 11/2001 | Gazdik | ......................... | 717/178 |
| 6,360,334 B1 * | 3/2002 | Kavanagh et al. | .............. | 714/38 |
| 6,360,366 B1 * | 3/2002 | Heath et al. | ................... | 717/178 |
| 6,389,510 B1 * | 5/2002 | Chen et al. | .................... | 711/113 |
| 6,397,381 B1 * | 5/2002 | Delo et al. | ..................... | 717/174 |
| 6,401,138 B1 * | 6/2002 | Judge et al. | ................... | 719/328 |
| 6,484,245 B1 * | 11/2002 | Sanada et al. | ................ | 711/164 |
| 6,623,377 B2 * | 9/2003 | Evans et al. | .................. | 473/342 |
| 6,934,722 B1 * | 8/2005 | Goshey et al. | ............... | 707/204 |
| 6,968,453 B2 * | 11/2005 | Doyle et al. | .................. | 713/168 |
| 2002/0010911 A1 * | 1/2002 | Cheng et al. | .................... | 717/4 |
| 2002/0019944 A1 * | 2/2002 | Kou | ............................ | 713/200 |
| 2002/0085579 A1 * | 7/2002 | Sullivan et al. | .............. | 370/428 |

(Continued)

OTHER PUBLICATIONS

"Release Notes - Microsoft SDK for Java Version 4.0", 1999 Microsoft Corporation.

(Continued)

*Primary Examiner*—Kenny Lin
*Assistant Examiner*—Lan-Dai T Truong
(74) *Attorney, Agent, or Firm*—Merchant & Gould P.C.

(57) ABSTRACT

An isolated persistent storage object accesses an isolated persistent storage region using identities of the application, an underlying component of the application, and optionally the user. Direct access to the isolated persistent storage region is available only to the isolated persistent storage object and is unavailable to other components. Accordingly, other components access the isolated persistent storage region through the isolated persistent storage object, which determines the specific location (e.g., specified by an internally constructed path name) and performs the access operation on behalf of the calling component. The application identity and the component identity are converted to typed identity names for use in the construction of the path name.

10 Claims, 5 Drawing Sheets

U.S. PATENT DOCUMENTS

2002/0103903 A1* 8/2002 Bruton et al. ............... 709/225
2002/0120679 A1* 8/2002 Hayton et al. ............... 709/203

OTHER PUBLICATIONS

"Q172200 HOWTO: Using Scratch Space From Your Java Applet", 1999 Microsoft Corporation.

"com.ms.io.clientstorage Package Overview," 1999 Microsoft Corporation.
"ClientStorageManager Class", 1999 Microsoft Corporation.
"ClientStore Class", 1999 Microsoft Corporation.
"ClientStore Class Methods", 1999 Microsoft Corporation.
"ClientStoragePermission Class", 1999 Microsoft Corporation.

* cited by examiner

000
ISOLATED PERSISTENT STORAGE

TECHNICAL FIELD

The invention relates generally to persistent storage of data in a computer system, and more particularly to isolating persistent storage of data in a computer system.

BACKGROUND OF THE INVENTION

An application running on a computer system can include a collection of code assemblies ("assemblies"). Generally, an assembly represents a collection of code, such as a collection of components object classes, modules, interfaces, data, metadata, resources, etc. An application can be implemented from a variety of assemblies, and the assemblies may have very different properties. For example, the assemblies can be published by different publishers or retrieved from different Internet locations. An application can include an executable program, utility, applet, service, or top level component. An application can also include a web page as a logical application when the hosting environment is a Web browser.

It is common for applications to persist data on the disk of the computer system (or some other accessible storage medium). One commonly used form of persistent storage is a "cookie", which is stored in a cookie file on the local hard drive. The use of cookies for persistent storage is limited because access to a cookie is keyed to the remote host and is restricted to only a single cookie per host. In addition, cookies lack flexibility in the type of storage provided so the storage space is not configurable to the needs of the program using it.

One or more components of an application are typically responsible for saving data in a persistent storage location accessible by the computer system. Assemblies that save data in a persistent storage location typically must invent path and files names that are intended to be unique within the storage region. However, there are no guarantees that another application or component, possibly developed by another company, will not use the same path name and file name. For example, an e-commerce application may retain encrypted credit card information for a particular user in a file name "\root\cccrypt.dat" on the hard disk of the computer system. However, because another application may coincidentally use the same path name and file name to persist its data, there is a risk that the second application may corrupt or overwrite the "\root\cccrypt.dat" file of the first application. This risk also compounds security concerns by allowing a possible rogue application to access persistent data of other applications.

Furthermore, some components may be used or shared by multiple applications. For example, a publishing application may use an instance of an image cache class (a persistent storage component) from a shared library (e.g., a .dll file) to persist relevant image data of a publishing document, while a browser application may use another instance of the same image cache class from the same shared library to persist relevant image data from the Web. If the shared image cache component needs to save different data depending on the application or calling component, the component typically requires the application or calling component to pass a presumably unique path name to the shared image cache component. The path name is then used to specify the directory in which to store the persistent data. This approach, however, requires some intelligence by the application or calling component to generate a unique name and still risks data corruption and information leakage if two different applications or calling components provide the same path name and file name to the image cache component. This scenario also risks allowing a possibly rogue application to access persistent data when such access is inappropriate.

SUMMARY OF THE INVENTION

Embodiments of the present invention solve the discussed problems by isolating persistent storage using identities derived from both the application and the component that is being used to store the data in the persistent storage location. Access to isolated persistent storage by applications and assemblies may be accomplished through a shared isolated persistent storage object. Alternatively, individual instances of an isolated persistent storage class may be used. The isolated persistent storage object determines the identities of both the application and the lowest level or component in the call stack (i.e., the component immediately preceding the call to the isolated persistent storage object). These identities are then used by the object to construct a unique path name into the isolated persistent storage region of the storage medium. Neither the application nor the calling component is responsible for or capable of specifying the path name, although in at least one embodiment, some naming parameters (e.g., a file name or relative path name) may be provided by the calling component. Access to the isolated persistent storage is only allowed through the isolated persistent storage object so that inadvertent or intentional access to another application's data is avoided.

In an implementation of the present invention, a method of accessing an isolated persistent storage region in the computer system is provided. The isolated persistent storage region is accessible by one or more applications providing an access request to access the isolated persistent storage region. A component identity associated with the component providing the access request is determined. An application identity associated with the application providing the access request is also determined. A path name to a persistent storage location in the isolated persistent storage region is constructed based on the component identity and the application identity. The persistent storage location is accessed based on the path name, in accordance with the access request.

In another implementation of the present invention, an isolated persistent storage system for accessing an isolated persistent storage region in a computer system is provided. The isolated persistent storage region is accessible by one or more applications. Each application has an application identity. A component provides an access request to access the isolated persistent storage region. An isolated persistent storage object determines an application identity and a component identity. The isolated persistent storage object also constructs a path name based on the application identity and the component identity to a storage location within the isolated persistent storage region. In addition, the isolated persistent storage object accesses the storage location in accordance with the access request.

In other implementations of the present invention, articles of manufacture are provided as computer program products. One embodiment of a computer program product provides a computer program storage medium readable by a computer system and encoding a computer program for executing a computer process that accesses an isolated persistent storage region in the computer system. Another embodiment of a computer program product may be provided in a computer data signal embodied in a carrier wave by a computing system and encoding the computer program that accesses an isolated persistent storage region in the computer system.

The computer program product encodes a computer program for executing on a computer system a computer process for accessing an isolated persistent storage region in the computer system is provided. The isolated persistent storage region is accessible by one or more applications providing an access request to access the isolated persistent storage region. A component identity associated with the component providing the access request is determined. An application identity associated with the application providing the access request is also determined. A path name to a persistent storage location in the isolated persistent storage region is constructed based on the component identity and the application identity. The persistent storage location is accessed based on the path name, in accordance with the access request.

These and various other features as well as other advantages, which characterize the present invention, will be apparent from a reading of the following detailed description and a review of the associated drawings.

DETAILED DESCRIPTION OF THE INVENTION

Embodiments of the present invention include a method and a system for accessing an isolated persistent storage region. Persistent storage is used by applications to cache data for future access. For example, an e-commerce retail application may persist credit card data on a user's local machine to alleviate the need of asking for the credit card information again for a subsequent purchase. However, inadvertent or intentional access to such persistent data can corrupt the data and expose the sensitive data to malicious applications.

Accordingly, an embodiment of the present invention (e.g., an isolated persistent storage object) accesses an isolated persistent storage region using identities of the application, an underlying component of the application, and optionally, the user. Direct access to the isolated persistent storage region is available only to the isolated persistent storage object and is unavailable to other components. Accordingly, other components access the isolated persistent storage region through the isolated persistent storage object (or multiple instances of an isolated persistent storage class), which determines the specific storage location (e.g., specified by an internally constructed path name) and performs the access operation on behalf of the calling component.

Figure 1:
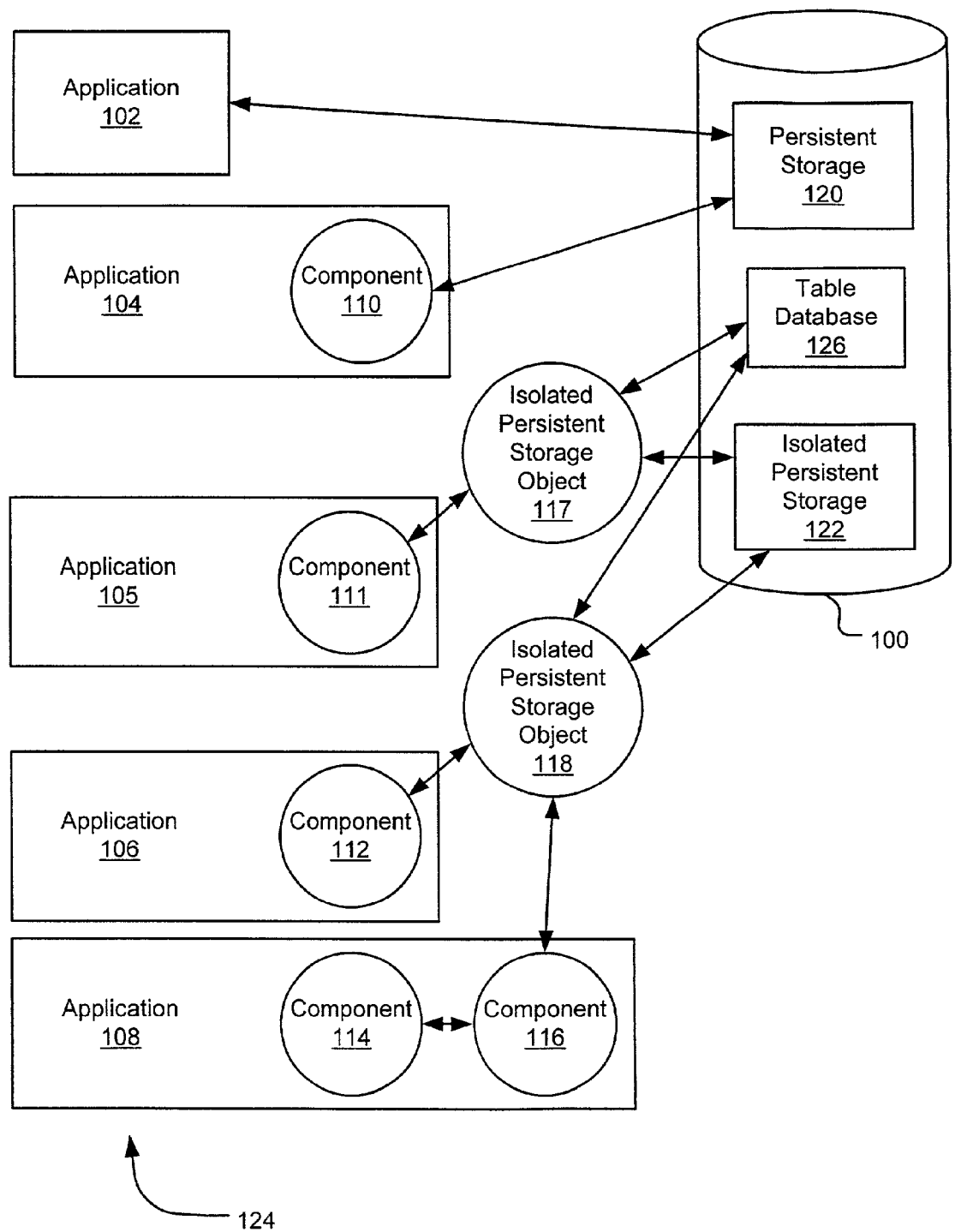
FIG. 1 illustrates applications accessing persistent storage in embodiments of the invention.

FIG. 1 illustrates applications 124 accessing persistent storage regions in embodiments of the invention. The persistent storage regions, including a persistent storage region 120 and an isolated persistent storage region 122, reside in a storage medium 100 accessible by the applications 124. A table database 126 is also illustrated as residing in the storage medium 100, although in an alternative embodiment, the storage regions 120 and 122 and the table database 126 can be distributed to different storage media. The persistent storage region 120 is typically a shared storage region, such as a region for storing and accessing cookies. The isolated persistent storage region 122 includes a storage region accessible by applications exclusively through an isolated persistent storage object 118.

An application 102 can directly access the persistent storage region 120 via instructions in the application 102. Alternatively, an application 104 can access the persistent storage region 120 via calls to instructions in a component 110. It should be understood that the instructions for accessing the persistent storage region 120 may include function calls to system-provided (e.g., operating system-provided or a runtime environment-provided) storage medium access functions. As described, however, persistent data stored in the persistent storage region 120 is subject to a risk of corruption or security violation.

In contrast, another application 106 can access the isolated persistent storage region 122 via a component 112. The component 112 is designed to access the isolated persistent storage region 122 through the isolated persistent storage object 118. Likewise, an application 108 accesses the isolated persistent storage region 122 via a component chain, which includes a component 114, a component 116, and the isolated persistent storage object 118. In an embodiment of the present invention, direct access to the isolated persistent storage region 122 is performed exclusively by the isolated persistent storage object 118, thereby maintaining the security and integrity of the isolated persistent storage region 122. In alternative embodiments, other objects can also directly access the isolated persistent storage region provided the objects comply with the isolation protocol disclosed herein.

An application can be "hosted" by various modules, such an operating system, a Web browser, or a SQL ("Structured Query Language") server. A host creates a "domain" (or a sub-process") in which an application executes. A host can also create multiple domains to support multiple applications. For example, in the case of a Web browser hosting the application, a domain can be created for each Web page or for each group of Web pages from a given Web site. Each domain stores the identity of the Web site from which the Web page is downloaded. A Web page may also include links to components, each of which may be from the same Web site as the Web page or from a different Web site. In addition, such a component may contain or be associated with a publisher's certificate.

The hosting environment can determine some identities of the domain and the component. For example, a web browser (a host) can create a domain for a Web page and set the domain identity to be the "hostname" of the URL ("Uniform Resource Locator") of the Web site from which the Web page was received. Other identities can be determined by the Common Language Runtime. For example, the runtime can determine the publisher of a component, if the component is signed by a publisher. It should be understood that identities can be determined in many ways by many different executable modules within the computer system within the scope of the present invention and should not be limited to the identity determination examples described.

In an embodiment of the present invention, an application, such as application 108, attempts to record persistent data in the isolated persistent storage region 122, which is accessible by the application 108. A user identity may be associated with the execution of the application (i.e., an identity of the user executing the application on the computer system). In addition, the application 108 may be associated with an application identity, and each component in the call chain (i.e., components 114 and 116) may be associated with a component identity.

Identities can be of different types, such as site indicator, publisher, public key, and any other custom identity. For example, an application identity of type "site indicator" can take the form of a "hostname" of an URL, such as "www.microsoft.com". Alternatively, an application identity of type "publisher" can take the form of a publisher's name or other identifier, such as "Microsoft" or "Yahoo", and may be based on a X509 certificate to allow authentication. An application identity of type "public key" can take the form of a public encryption key (i.e., a security characteristic). Likewise, component identities can have similar identity types. Generally, the identities are used to differentiate applications or components developed by different companies or different applications and components developed by the same company. It should be understood that other application and component identity types may be employed within the scope of the present invention.

The isolated persistent storage object 118 determines identities associated with the application and a component within the runtime call stack. The runtime call stack represents a runtime calling chain of components invoked during the execution of the application. For example, in FIG. 1, the application 108 includes a component 114 during execution. The component 114 thereafter performs a method call to the component 118 during execution. The component 116 then performs a method call to the isolated persistent storage object 118 to access the isolated persistent storage region 122 during execution. As such, the component 114, the component 116, and the isolated persistent storage object 116 sequentially form a runtime call stack in which the isolated persistent storage object 118 represents the "current" component in the runtime call stack. The component 114 and 116 represent "preceding" components in the runtime call stack. The component 116 also represents the "calling" component in the runtime call stack, relative to the isolated persistent storage object 118. The isolated persistent storage object 118 is capable of "walking" the runtime call stack to determine properties of preceding components in the runtime call stack.

The isolated persistent storage object 118 determines the appropriate identities and generates unique application and component names for each identity using name tables that are maintained on a per machine and per user basis. The names are used to construct a unique path name into the isolated persistent storage region. As such, isolated persistent storage locations accessed by the same program on the same machine by different users are assigned different path names. Likewise, persistent storage locations accessed by different programs executed by the same user on the same machine are guaranteed to have different path names if the application and component identities are different. The isolated persistent storage object 118 uses these path names to isolate data persisted by these components in association with execution of given applications. Furthermore, access to the isolated persistent storage region 122 by other objects (i.e., objects other than the isolated persistent storage object 118) is precluded by the security architecture of the runtime environment.

FIG. 1 also shows a second instance of an isolated persistent storage class as isolated persistent storage object 117. A component 111 in an application 105 accesses the isolated persistent storage region 122 through the isolated persistent storage object 117. Accordingly, in one embodiment, distinct instances (e.g., object 117 and 188) of an isolated persistent storage class may be used by different applications (e.g., applications 105 and 106). In another embodiment, a single instance (e.g., object 118) of an isolated persistent storage class may be shared by different applications (e.g., applications 106 and 108). The isolated persistent storage objects 117 and 118 can access the table database 126 to computer application and component identities.

In an embodiment of the present invention, isolation can consist of three isolation levels: (1) the user level, (2) the application level, and (3) the component level. This architecture can be used to isolate persisted data in all forms, including the file system data, databases, and properties (e.g., browser cookies). It should be understood that additional or alternative isolation levels may also be employed within the scope of the present invention. In addition, the user level of isolation may be omitted without departing from the scope of present invention. Furthermore, applications that require secure isolation can sign their components using publisher certificates to prevent other applications from impersonating a trusted component.

Figure 2:
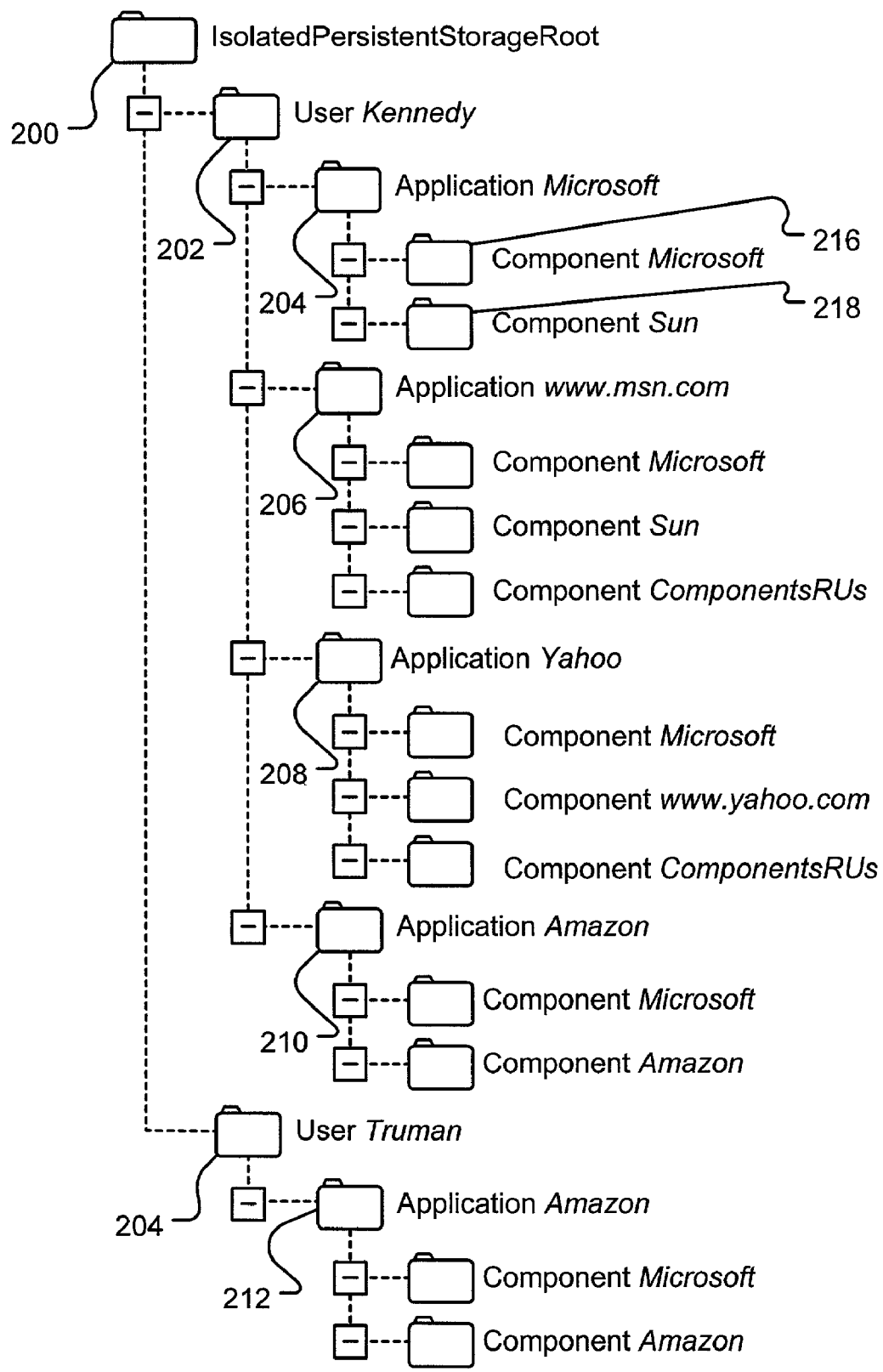
FIG. 2 illustrates an exemplary structure for an isolated persistent storage region in an embodiment of the present invention.

FIG. 2 illustrates an exemplary structure for an isolated persistent storage region in an embodiment of the present invention. The illustrated isolated persistent storage region is represented as a conventional directory structure in a file system, although other storage organizations (e.g., databases and virtual file systems) are contemplated within the scope of the present inventions. The directory structure has a root level 200 labeled "IsolatedPersistentStorageRoot". Within the isolated persistent storage region, the user level is represented by two directories 202 and 204: Kennedy and Truman. The application level associated with the user Kennedy includes directories 204, 206, 208, and 210 associated with four application identities: Microsoft, www.msn.com, Yahoo, and Amazon. The "Microsoft", "Yahoo", and "Amazon" identities represent publishers of applications (i.e., "publisher" identity types), whereas the www.ms.com identity represents a web site (i.e., a "site indicator" identity type). Likewise, the application level associated with the user Truman includes directory 212 for the application identity Amazon. An exemplary path name can take the form of: "<IsolatedPersistentStorageRoot>\<UserName>\<ApplicationName>\<ComponentName>", such as "\root\Kennedy\Microsoft\Microsoft".

In an alternative embodiment of the present invention, the isolated persistent storage region is divided into individual isolated persistent storage regions on a per user basis. Accordingly, rather than allocating all isolated persistent storage under one "IsolatedPersistentStorageRoot" directory, each user directory contains its own "IsolatedPersistentStorageRoot" directory structure. As such, an exemplary path name can take the form of: "<UserName>\<IsolatedPersistentStorageRoot>\<ApplicationName>\<ComponentName>". In another alternative embodiment, the application level and the component level in the path name can be reversed.

Each application level directory contained subdirectories of one or more component level directories. For example, the application level directory Microsoft corresponding to the user Kennedy contains two component level directories 216 and 218: Microsoft and Sun. As described above, each component level directory corresponds to a component identity (e.g., a component's publisher) of a component accessing the isolated persistent storage region through the isolated persistent storage object 118 of FIG. 1. Furthermore, the exemplary application and component identity names shown in FIG. 2 are textual names corresponding to application and component publisher identities. However, as described below, embodiments of the present invention can generate or encode names in a variety of ways.

In one embodiment of the present invention, the isolated persistent storage objects 117 and 118 of FIG. 1 generate names using name and type tables. The name and type tables are stored in a back end data store 126 (called storedb) that is accessible by the isolated persistent storage object 118 of FIG. 1. An exemplary type table is illustrated below in Table 1.

TABLE 1

Exemplary Type Table

| Identity Type | TypeID | Name Table Handle |
|---|---|---|
| Publisher | 1 | 850 |
| Site Indicator | 2 | 900 |
| . . . | . . . | . . . |
| . . . | . . . | . . . |
| CustomIdentity | 75 | 930 |

Column 1 of the type table includes fields identifying a type of application or component identity. Identities are retrieved from the application domain or the component. The type of identity selected by the isolated persistent storage object may be specified by a selection protocol. In one embodiment of the present invention, the most secure identity available is selected. For example, an authenticated publisher of a component is considered more secure than a originating site indicator, which may be spoofed by a hacker. Alternatively, the selection criteria may be configured by the user or a system administrator in accordance with desired security policies. Column 2 of the type table includes fields indicating a type identifier associated with a corresponding identity type. Column 3 of the type table includes fields indicating a handle of a name table associated with the corresponding identity type and type identifier.

Each name table handle references a name table corresponding to a selected identity type. For example, Table 2 illustrates exemplary name table corresponding to the type identifier "2" (for the site indicator type) and has an associated name table handle of "900".

TABLE 2

Exemplary Name Table Associated with Site Indicators

| Site Indicator Identity | NameID | More Info Handle |
|---|---|---|
| www.microsoft.com | 1 | 2000 |
| www.msn.com | 2 | 3700 |
| . . . | . . . | . . . |
| . . . | . . . | . . . |
| www.yahoo.com | 55 | 7000 |

Column 1 of the name table includes fields identifying an identity for a given identity type. Column 2 of the name table includes fields indicating an identifier associated with a corresponding identity. Column 3 of the name table includes fields identifying a handle to a data structure or table containing additional information relating to the corresponding name, such as the amount of resources used by the application and component combination to which the handle is associated.

To illustrate the use of type and name tables, two examples are described. In the first example, a user Kennedy is viewing a web page from site www.yahoo.com. The web page (having an application level identity) includes an embedded component (e.g., an intermediate language application) published by Microsoft. The component is executable within the user's browser. Using the naming scheme configured by the type table of Table 1 and the name table of Table 2, the name www.yahoo.com of type "site indicator", corresponding to TypeID=2 and name table handle=900. Within the name table, www.yahoo.com corresponds to a NameID=55. Accordingly, by combining the TypeID and the NameID of the detected application identity, the application level name equals "2.55".

To extend the example to the component level, the publisher identity of the embedded component corresponds to a TypeID=1 and a Name Table Handle 850 in Table 1. An exemplary name table corresponding to the publisher identity type is illustrated in Table 3.

TABLE 3

Exemplary Name Table Associated with Publishers

| Publisher Identity | NameID | More Info Handle |
|---|---|---|
| Yahoo | 1 | 8000 |
| Sun | 2 | 8500 |
| Microsoft | 3 | 9000 |
| . . . | . . . | . . . |
| ComponentsRUs | 30 | 14000 |

Accordingly, because the embedded component is published by Microsoft, the component level name is "1.3". As such, the full path name of the isolated persistent storage associated with the embedded components is "c:\Root\Kennedy\2.55\1.3".

The type and name tables in storedb may be stored as memory mapped files. Each type and identity instance is stored as a binary serialized BLOB (i.e., a Binary Large OBject), although other storage formats are contemplated within the scope of the present invention. A BLOB is a field that can hold any digitized information, including data structures, objects, images, audio, video, and long text blocks. In an embodiment of the present invention, type and name instances are serialized to generate a BLOB from a type or identity instance. Serialization can include creation of a stream or array of bytes that represents the state of an object. The serialized data captures the state of the objects, uniquely describing the particular instance of the object. An object can be uniquely recreated to its original state (i.e., before serialization) from these bytes. Likewise, a BLOB can be deserialized (i.e., read in serial order) to regenerate the original type or name instance.

Figure 3:
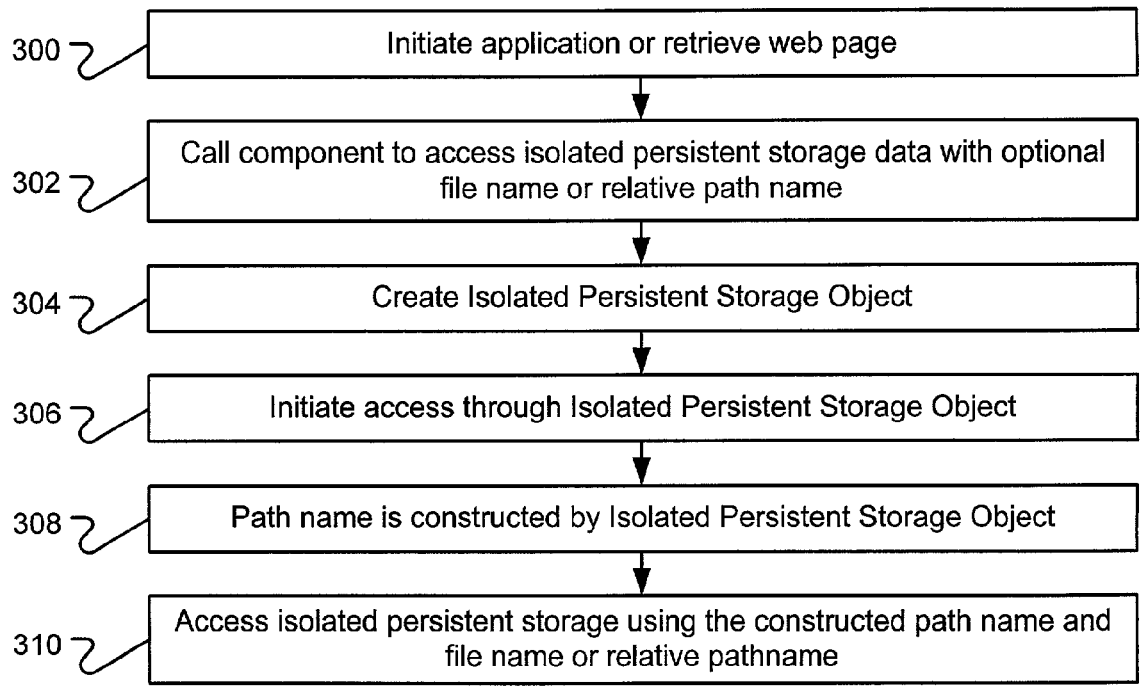
FIG. 3 illustrates operations for accessing an isolated persistent storage region through an isolated persistent storage object in an embodiment of the present invention.

FIG. 3 illustrates operations for accessing (e.g., read or write) an isolated persistent storage region through an isolated persistent storage object in an embodiment of the present invention. To open or create a file in an isolated persistent storage region, an application or component creates an isolated persistent storage object and passes a file name (e.g., a simple file name or a file name with a relative path) for the file to the object in an access request. The isolated persistent storage object receives the access request through an isolated persistent storage interface from the application or component and evaluates the execution environment to construct the appropriate path name to a storage location in the isolated persistent storage region. The path name to the source or destination storage location in the isolated persistent storage region is determined by the isolated persistent storage object and not the application or component that originates the request. The application or component exchanges data with the isolated persistent storage object to complete the access operation.

Initial operation 300 initiates or invokes an application or alternatively retrieves a web page to the computer system.

Calling operation 302 calls a component to access isolated persistent storage data, optionally providing a file name or relative path name for the requested access. Such access may include operations such as opening a file, closing a file, reading data, writing data, creating a directory, removing a directory, and other data access operations. If file name or relative path name is not provided, the isolated persistent storage object may use a default file name in combination with a constructed path name to indicate the appropriate isolated persistent storage location. Furthermore, the component called by calling operation 302 can be one of multiple components in the runtime call stack. The component receives the access request for a preceding component and creates an isolated persistent storage object (see object 118 in FIG. 1) in creating operation 304. Initiating operation 306 initiates access to the isolated persistent storage region through the isolated persistent storage object. Construction operation 308 constructs an appropriate path name associated with the user name, the application name, and the component. The constructed path name references a storage location within the isolated persistent storage region. Access operation 310 accomplishes the access to the isolated persistent storage region using the constructed path name and the provided file name or relative path name.

By this illustration, it is clear that access to a storage location within the isolated persistent storage region is accomplished through the isolated persistent storage object. Moreover, the calling component does not specify a storage location for the persistent data. Instead, the isolated persistent storage object determines the appropriate isolated persistent storage location (e.g., a path name to the appropriate storage location, based on the object's evaluation of the runtime call stack and the runtime environment (e.g., the user)).

Figure 4:
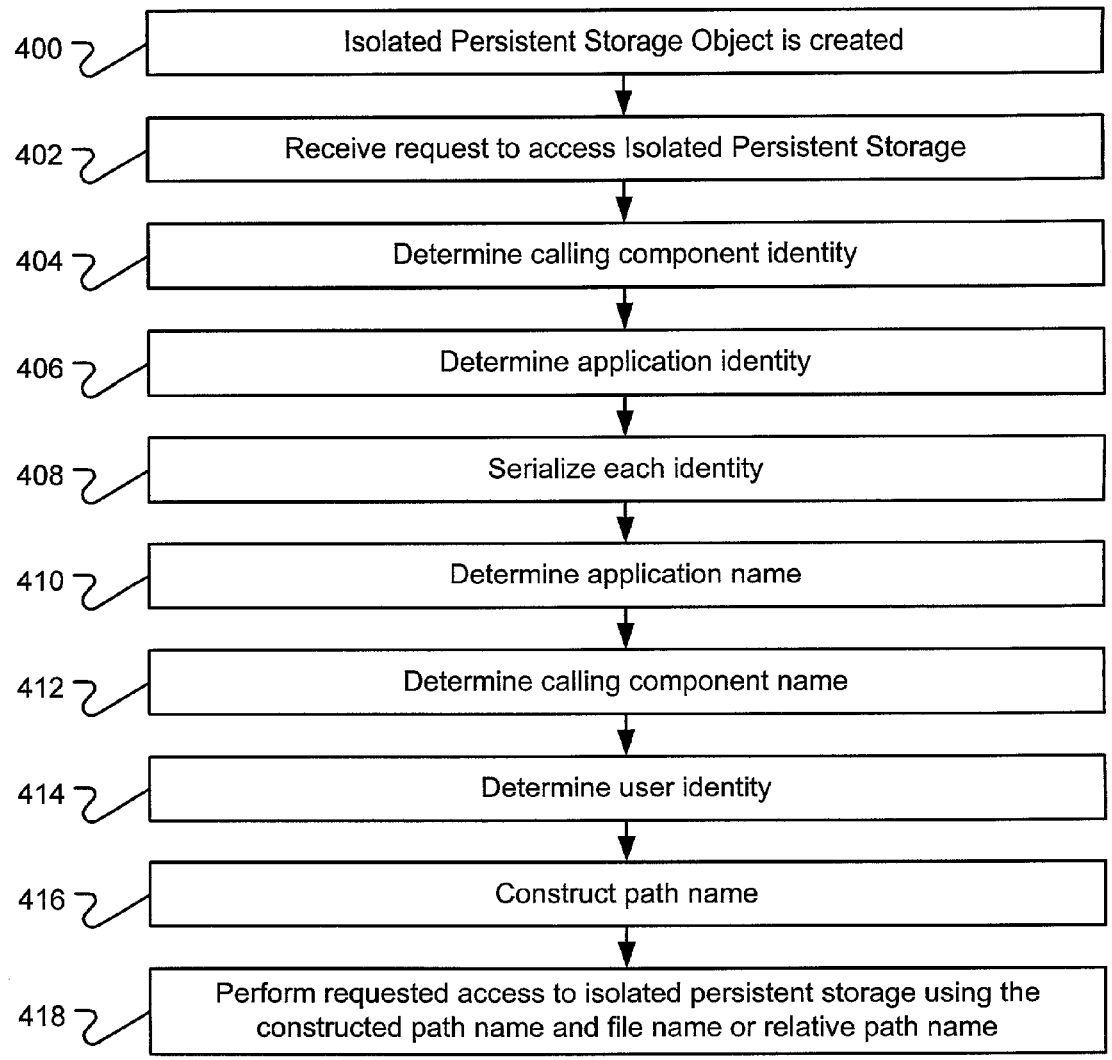
FIG. 4 illustrates operations for implementing an access operation to an isolated persistent storage region requested by a component in an embodiment of the present invention.

FIG. 4 illustrates operations for implementing an access operation (e.g., read or write) to an isolated persistent storage region requested by a component in an embodiment of the present invention. Creation operation 400 substantially corresponds to the creation operation 304 in FIG. 3; however, the operations in FIG. 4 are described from the perspective of the isolated persistent storage object. Receiving operation 402 receives a request from a component for access to isolated persistent storage.

A determining operation 404 determines the calling component identity. In an embodiment of the present invention, the determining operation 404 determines the component identity by performing a "runtime call stack walk". The "current" component (i.e., the component containing the isolated persistent storage object) determines the "preceding" component in the runtime call stack. To walk the stack, the isolated persistent storage object calls a system module called the "Code Manager" to get the calling component. The isolated persistent storage object then asks the runtime process for one or more of the component's "identities", which can include the publisher, the site indicator of origin, strong names, public keys, etc. The determining operation 404 also selects one of the identities on a predetermined basis, such as the most secure identity. For example, the site indicator can be "spoofed" by a rogue component, whereas the publisher of a component, if associated with a signed certificate, may be selected as a more secure identity. As a result of the selection, the determining operation 404 also determines the "type" of the identity selected.

A determining operation 406 determines the identity of the application or web page associated with the calling component. The runtime environment or browser can be queried for the domain of the application or web page. The domain is then queried to obtain the identities associated with the domain (e.g., the URL of the web page or the publisher of the application). The determining operation 406 selects one of the identities on a predetermined basis, such as the most secure identity. As a result of the selection, the determining operation 406 also determines the "type" of the identity selected.

A serialization operation 408 serializes each identity. The serialized identity is used to look up the corresponding type and name in tables similar to Tables 1-3. A determining operation 410 determines the name of the application, and a determining operation 412 determines the name of the component, as discussed with regard to Tables 1-3. A determining operation 414 determines the identity of the user. In one embodiment of the present invention, the identity of the user is determined by a query to the operation system, although other methods may be employed within the scope of the present invention. A construction operation 416 constructs the path name to the storage location in the isolated persistent storage region. An access operation 418 executes the requested access using the constructed path name and provided file name or relative path name.

Figure 5:
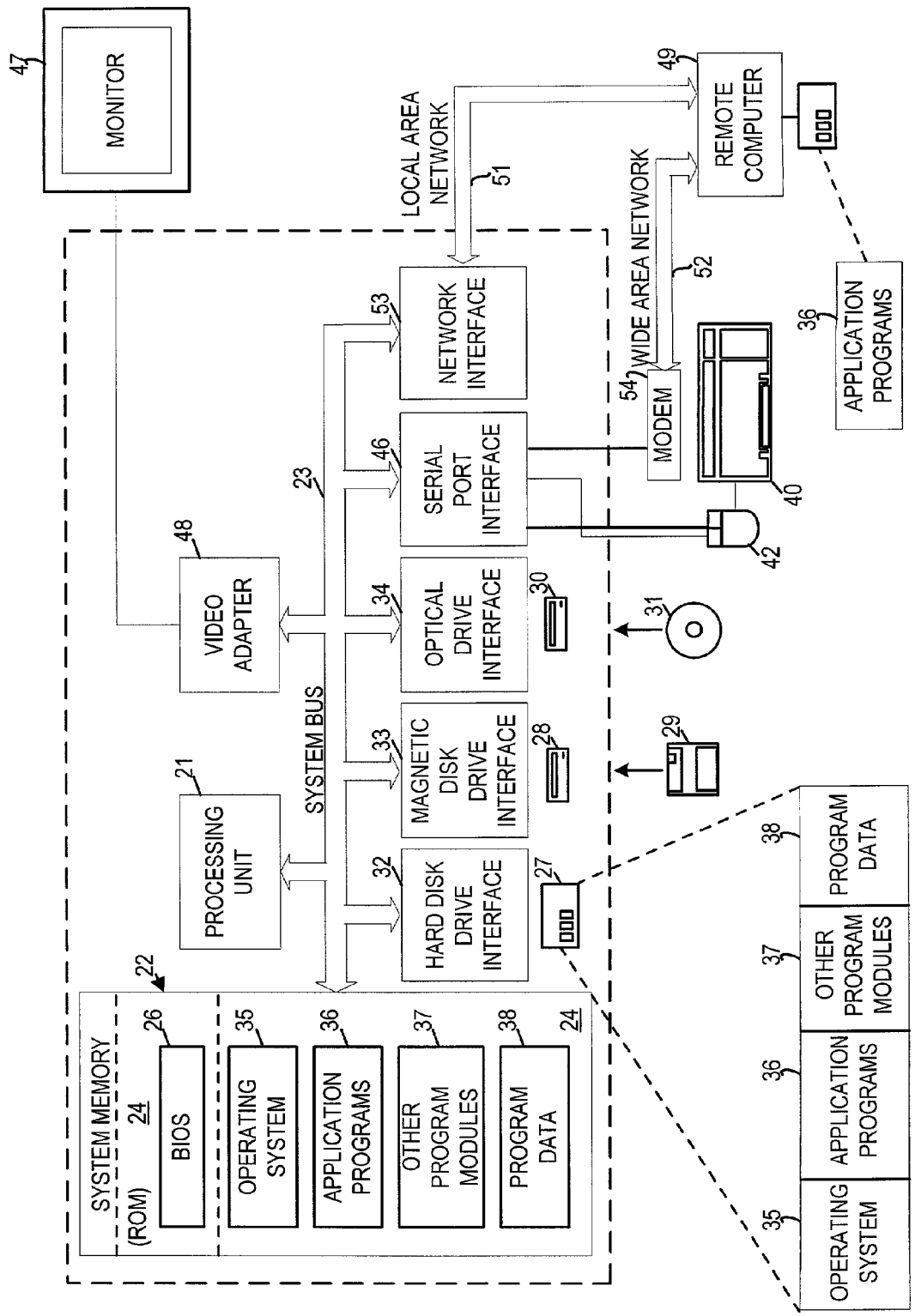
FIG. 5 illustrates an exemplary system useful for implementing an embodiment of the present invention.

The exemplary hardware and operating environment of FIG. 5 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an embodiment of the present invention, an isolated persistent storage module may be incorporated as part of the operating system 35, application programs 36, or other program modules 37. A storage database (e.g., storedb) may be coded into the isolated persistent storage module or may be stored as program data 38.

In a trusted environment, access to persistent storage can be limited by security policies to access through an isolated persistent storage system, particularly on the basis of security characteristics, such as public encryption keys or certificates. As such, non-secure or less secure programs and components can be prevented from accessing the isolated persistent storage region. Therefore, the isolated persistent data of other programs and components (i.e., secure programs and applications) can remain safe.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

We claim:

1. A computer readable-storage medium which stores a set of instructions which when executed by a computer system causes the computer system to perform a method for identifying an isolated persistent storage region in the computer system, the isolated persistent storage region being accessible by one or more applications, the method executed by the set of instructions comprising:

receiving, at an isolating storage interface of the computer system, a first request to access the isolated persistent storage region of the computer system, wherein receiving the first request to access the isolated persistent storage region includes receiving the first request from a first requesting application via a first requesting component of the first requesting application;

preventing access to the isolated persistent storage region if access is not requested through the isolating storage interface, wherein preventing access to the isolated persistent storage region is accomplished by a security architecture of a runtime environment;

determining a first requesting component identity of the first requesting component that is used by the first requesting application to request access to the isolated persistent storage region;

determining a first requesting application identity of the first requesting application that is using the first requesting component to request access to the isolated persistent storage region; and constructing a first path name to a first persistent storage location in a plurality of persistent storage locations in the isolated persistent storage region based on the first requesting component identity and the first requesting application identity, wherein access is only enabled to the first persistent storage location in the plurality of isolated persistent storage locations using the first path name, wherein at least one of a different requesting application and a different requesting component results in construction of a different path name, and wherein the different path name enables access only to a second persistent storage location in the plurality of persistent storage locations, wherein the constructing operation comprises:

determining an application identity type and an application name, based on the first requesting application identity;

determining a component identity type and a component name, based on the first requesting component identity; and combining the application identity type, the application name, the component identity type, and the component name into the first path name to the first persistent storage location in the plurality of persistent storage locations in the isolated persistent storage region;

accessing the first persistent storage location in the plurality of persistent storage locations based on the path name;

wherein determining the first requesting component identity comprises:
  identifying one or more possible component identities based on the first requesting component; and
  selecting one of the possible component identities as the first requesting component identity;
receiving at the isolating storage interface of the computer system a second request to access the isolated persistent storage region, wherein receiving the second request to access the isolated persistent storage region includes receiving the second request from a second requesting application, wherein the second requesting application uses a second requesting component to access the isolated persistent storage region, and wherein the second request from the second requesting application is received at the isolating storage interface via the second requesting component;
determining a second requesting component identity of the second requesting component that is used by the second requesting application to request access to the isolated persistent storage region;
determining a second requesting application identity of the second requesting application that is using the second requesting component to request access to the isolated persistent storage region; and
constructing a second path name to a second persistent storage location in the isolated persistent storage region based on the second requesting component identity and the second requesting application identity; wherein the second persistent storage location is accessible only through the second path name and is not accessible from any other path name.

2. The computer-readable storage medium of claim 1 wherein the operation of determining a requesting application identity comprises:
  querying a domain of the first requesting application for one or more possible requesting application identities; and
  selecting one of the possible requesting application identities as the first requesting application identity.

3. The computer-readable storage medium of claim 2 wherein the selecting operation comprises:
  selecting the first requesting application identity based on one or more security characteristics associated with the first requesting application identity.

4. The computer-readable storage medium of claim 1 wherein the operation of determining a first requesting application identity comprises:
  determining a public key associated with the first requesting application.

5. The computer-readable storage medium of claim 1 wherein the operation of determining a first requesting application identity comprises:
  determining a site indicator associated with the first requesting application.

6. The computer-readable storage medium of claim 1 wherein the operation of determining a first requesting application identity comprises:
  determining a publisher associated with the first requesting application.

7. The computer-readable storage medium of claim 1 wherein the operation of determining a first requesting component identity comprises:
  determining a public key of associated with the first requesting component.

8. The computer-readable storage medium of claim 1 wherein the operation of determining a first requesting component identity comprises:
  determining a site indicator associated with the first requesting component.

9. The computer-readable storage medium of claim 1 wherein the operation of determining a first requesting component identity comprises:
  determining a publisher associated with the first requesting component.

10. The computer-readable storage medium of claim 9 wherein the selecting operation comprises:
  selecting the first requesting component identity based on security characteristics of the requesting component identity.

* * * * *